No. 890,414. PATENTED JUNE 9, 1908.
W. T. DE WORTH.
HOSE CLAMP.
APPLICATION FILED JUNE 26, 1906.
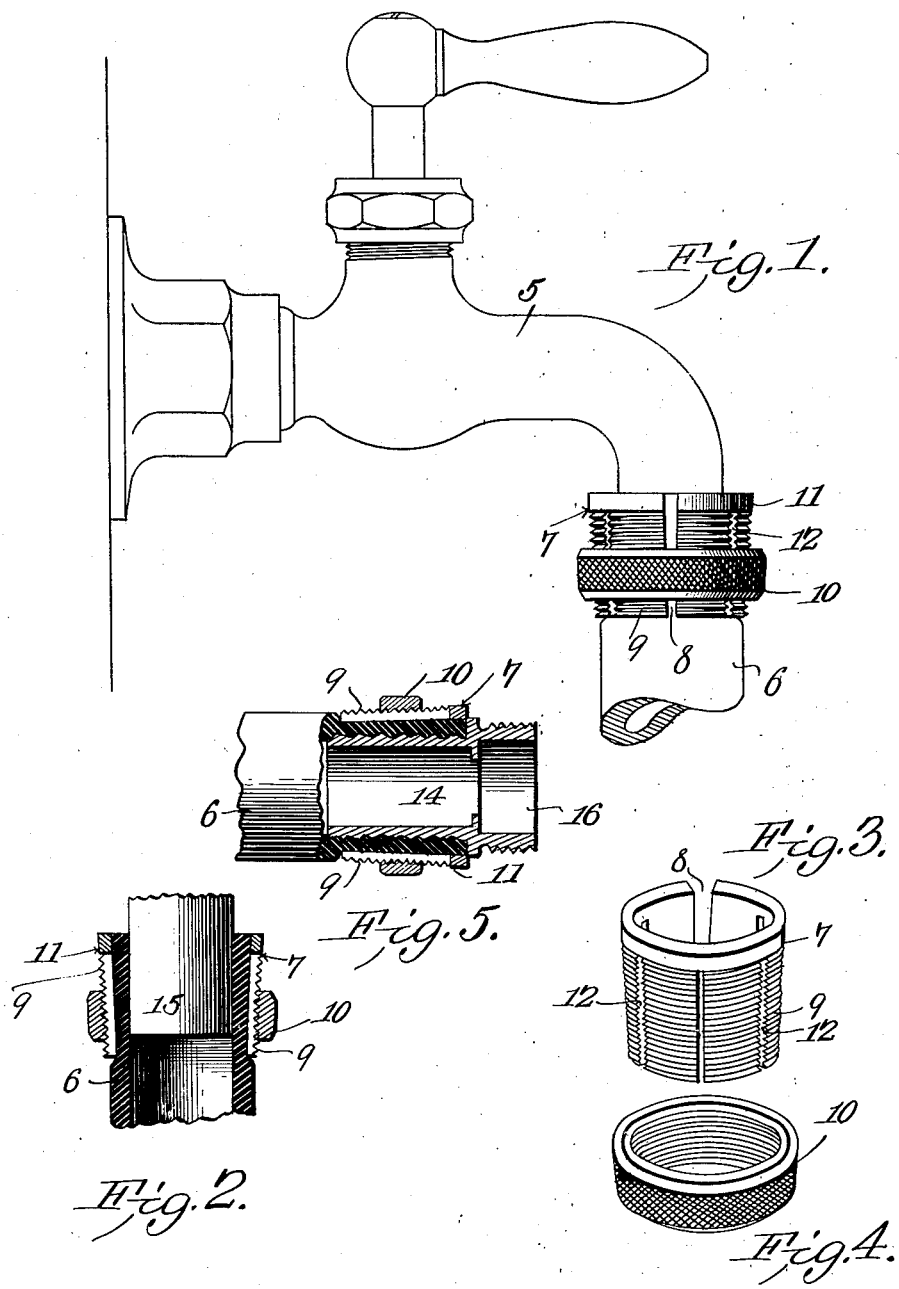
WITNESSES: William T. DeWorth, INVENTOR.
By ATTORNEYS

UNITED STATES PATENT OFFICE.

WILLIAM T. DE WORTH, OF BORDENTOWN, NEW JERSEY.

HOSE-CLAMP.

No. 890,414.  Specification of Letters Patent.  Patented June 9, 1908.

Application filed June 26, 1906. Serial No. 323,504.

*To all whom it may concern:*

Be it known that I, WILLIAM T. DE WORTH, a citizen of the United States, residing at Bordentown, in the county of Burlington and State of New Jersey, have invented a new and useful Hose-Clamp, of which the following is a specification.

This invention relates to hose couplers and has for its object to provide means whereby a hose or other fluid conducting pipe may be secured to the discharge end of a faucet without the employment of the usual threaded nipple or coupling.

A further object is to provide an expansible sleeve having a clamping collar associated therewith and adapted to compress the walls of the sleeve thereby to clamp the hose in frictional engagement with the faucet.

A further object is to provide a threaded sleeve one end of which is tapered and provided with a plurality of spaced longitudinal slots, the threads at the opposite end of the sleeve being spaced inwardly to present a smooth bearing surface for engagement with a suitable tool when positioning the device on a hose or other fluid conducting pipe.

A still further object of the invention is to generally improve this class of devices so as to increase their utility, durability, and efficiency as well as to reduce the cost of manufacture.

With these and other objects in view the invention consists in the construction and novel combination and arrangement of parts hereinafter fully described, and illustrated in the accompanying drawings, it being understood that various changes in form, proportions and minor details of construction may be resorted to within the scope of the appended claims.

In the accompanying drawings forming a part of this specification: Figure 1 is a side elevation of a hose constructed in accordance with my invention showing the same applied to a faucet. Fig. 2 is a longitudinal sectional view of the same. Fig. 3 is a detail perspective view of the contractible sleeve detached. Fig. 4 is a similar view of the clamping collar, and, Fig. 5 is a longitudinal sectional view showing the coupling used for connecting two sections of hose.

Similar numerals of reference indicate corresponding parts in all of the figures of the drawings.

The improved coupling is principally designed for connecting a hose or similar fluid conducting pipe to the discharge end of a faucet and by way of illustration is shown applied to a faucet of the ordinary construction in which 5 designates the faucet and 6 a portion of the hose.

The coupling consists of a contractible sleeve 7 the adjacent longitudinal edges of which are spaced apart to form a slot as indicated at 8 and the exterior walls thereof threaded at 9 for the reception of a clamping collar 10. The threads 9 are spaced inwardly from one end of the sleeve to form an annular bearing surface 11 preferably disposed in alinement with the threads 9 for engagement with a wrench or similar tool when positioning the sleeve on the hose 6 so as to prevent the sleeve from rotating when adjusting the clamping member or collar 10. The threaded walls of the sleeve are inclined or tapered towards one end thereof and formed in said walls are a plurality of spaced recesses 12 which extend from the smooth bearing surface 11 and open through the reduced end of the sleeve, as shown, so that when the clamping collar 10 is adjusted on the threaded end of said sleeve the walls of the latter will be compressed and clamped in engagement with the hose thus securing the hose in position on the faucet without the employment of the usual threaded nipple.

In using the device the end of the hose is positioned over the discharge end 15 of the faucet and the collar 10 adjusted longitudinally of the sleeve thus clamping the hose in frictional engagement with the faucet and forming a water tight union between the same. When the coupling is used for connecting two or more sections of hose the extension 14 of the nipple 16 is inserted in one end of the hose after which the sleeve is placed in position and the collar 10 adjusted in the manner before stated thereby preventing accidental withdrawal of said nipple.

While the coupling is principally designed for use on ordinary garden hose it is obvious that the same may be used with equally good results on steam, air or other fluid conducting pipes.

From the foregoing description it is thought that the construction and operation of the device will be readily understood by those skilled in the art and further description thereof is deemed unnecessary.

Having thus described the invention what is claimed is:

A hose coupling comprising a sleeve formed from a single piece of metal and having its side walls of uniform thickness throughout but tapered towards one end of the sleeve to form a truncated cone and provided with exterior threads which terminate short of the opposite end of said sleeve to form an annular collar having a smooth exterior surface disposed in alinement with the threads and arranged flush therewith, the interior walls of the sleeve being unobstructed throughout their entire length to form a smooth bearing surface for engagement with a hose, there being a longitudinally disposed slot extending the entire length of the sleeve and intersecting the annular collar, and a plurality of spaced longitudinal recesses formed in the threaded walls of the sleeve on each side of the slot and extending from the inner end of the collar to and opening through the reduced end of the sleeve, the walls of said recesses being arranged parallel with each other and disposed at right angles to the transverse axis of the sleeve, one of said recesses being arranged in alinement with the vertical slot, and a clamping collar having its interior walls threaded for engagement with the threads on the exterior walls of the sleeve and having its exterior surface roughened, the threads on the sleeve between the spaced recesses being continuous and unobstructed.

In testimony that I claim the foregoing as my own, I have hereto affixed my signature in the presence of two witnesses.

WILLIAM T. DE WORTH.

Witnesses:
JOSEPH R. KEATING,
JOHN F. KEATING.